(12) United States Patent
Sutaria et al.

(10) Patent No.: US 9,578,027 B1
(45) Date of Patent: *Feb. 21, 2017

(54) MULTIPLE DATA STORE AUTHENTICATION

(71) Applicant: Seven Networks, LLC, Marshall, TX (US)

(72) Inventors: Jay Sutaria, Mountain View, CA (US); Brian Daniel Gustafson, Montara, CA (US); Robert Paul van Gent, Redwood City, CA (US); Ruth Lin, Santa Clara, CA (US); David Merriwether, Menlo Park, CA (US); Parvinder Sawhney, Fremont, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,061

(22) Filed: May 15, 2016

Related U.S. Application Data

(63) Continuation of application No. 14/487,093, filed on Sep. 16, 2014, now Pat. No. 9,342,684, and a continuation of application No. 13/614,583, filed on Sep. 13, 2012, now Pat. No. 8,839,412, which is a continuation of application No. 11/640,629, filed on Dec. 18, 2006, now Pat. No. 8,438,633, which is a continuation-in-part of application No. 11/525,294, filed on Sep. 21, 2006, now Pat. No. 8,064,583, which is a continuation of application No. 11/112,690, filed on Apr. 21, 2005, now Pat. No. 7,796,742.

(51) Int. Cl.
*G06F 21/00* (2013.01)
*H04L 29/06* (2006.01)

(52) U.S. Cl.
CPC ......... *H04L 63/0876* (2013.01); *H04L 63/102* (2013.01)

(58) Field of Classification Search
CPC .......................... G06F 21/44; H04L 63/0876
See application file for complete search history.

(56) References Cited

U.S. PATENT DOCUMENTS

| 5,790,790 | A | 8/1998 | Smith et al. |
| 5,862,223 | A | 1/1999 | Walker et al. |
| 5,961,590 | A | 10/1999 | Mendez et al. |

(Continued)

OTHER PUBLICATIONS

USPTO, Notice of Allowance for U.S. Appl. No. 15/045,357, mailed on Jul. 12, 2016.

(Continued)

*Primary Examiner* — Morshed Mehedi
(74) *Attorney, Agent, or Firm* — NK Patent Law, PLLC

(57) ABSTRACT

System and methods for authenticating access to multiple data stores are disclosed. The system may include a server coupled to a network, a client device in communication with the server via the network and a plurality of data stores. The server may authenticate access to the data stores and forward information from those stores to the client device. An exemplary authentication method receives a request for access to data. Information concerning access to that data is stored and associated with an identifier assigned to a client device. If the identifier is found to correspond to the stored information during a future request for access to the store, access to that store is granted.

26 Claims, 4 Drawing Sheets

(56) References Cited

U.S. PATENT DOCUMENTS

| | | |
|---|---|---|
| 6,170,014 B1 | 1/2001 | Darago et al. |
| 6,336,138 B1 | 1/2002 | Caswell et al. |
| 6,430,602 B1 | 8/2002 | Kay et al. |
| 6,886,030 B1 | 4/2005 | Easterbrook et al. |
| 6,965,917 B1 | 11/2005 | Aloni et al. |
| 6,987,734 B2 | 1/2006 | Hundemer |
| 7,240,095 B1 | 7/2007 | Lewis |
| 7,260,590 B1 | 8/2007 | Williams |
| 7,324,473 B2 | 1/2008 | Cornelle et al. |
| 7,650,416 B2 | 1/2010 | Wu et al. |
| 7,650,432 B2 | 1/2010 | Bosworth et al. |
| 7,707,573 B1 | 4/2010 | Marmaros et al. |
| 7,796,742 B1 | 9/2010 | Sutaria et al. |
| 8,064,583 B1 | 11/2011 | Sutaria et al. |
| 8,438,633 B1 | 5/2013 | Backholm et al. |
| 8,839,412 B1 | 9/2014 | Backholm et al. |
| 8,917,826 B2 | 12/2014 | Bravo et al. |
| 2001/0034225 A1 | 10/2001 | Gupte et al. |
| 2003/0084165 A1 | 5/2003 | Kjellberg et al. |
| 2003/0157947 A1 | 8/2003 | Fiatal et al. |
| 2003/0204708 A1 | 10/2003 | Hulme et al. |
| 2003/0236981 A1* | 12/2003 | Marmigere ......... H04L 12/5895 713/168 |
| 2004/0054711 A1* | 3/2004 | Multer ................ H04L 67/1095 709/201 |
| 2004/0064488 A1* | 4/2004 | Sinha .................. G06F 11/1451 |
| 2004/0082346 A1* | 4/2004 | Skytt .................... H04W 24/02 455/456.3 |
| 2004/0151186 A1 | 8/2004 | Akama |
| 2004/0204085 A1 | 10/2004 | Vargas et al. |
| 2004/0249961 A1* | 12/2004 | Katsube ................. H04L 63/08 709/229 |
| 2004/0268148 A1 | 12/2004 | Karjala et al. |
| 2005/0010694 A1 | 1/2005 | Ma et al. |
| 2005/0055578 A1 | 3/2005 | Wright et al. |
| 2005/0094625 A1 | 5/2005 | Bouat |
| 2005/0099963 A1 | 5/2005 | Multer et al. |
| 2005/0125459 A1 | 6/2005 | Sutinen et al. |
| 2005/0198170 A1 | 9/2005 | LeMay et al. |
| 2006/0020525 A1* | 1/2006 | Borelli ................... G06Q 30/04 705/34 |
| 2006/0031365 A1 | 2/2006 | Kay et al. |
| 2006/0069687 A1 | 3/2006 | Cui et al. |
| 2006/0149843 A1 | 7/2006 | Rhoads et al. |
| 2006/0165226 A1 | 7/2006 | Ernst et al. |
| 2006/0168043 A1 | 7/2006 | Eisenberger et al. |
| 2006/0168164 A1 | 7/2006 | Lemson et al. |
| 2006/0184591 A1 | 8/2006 | Backholm et al. |
| 2006/0190984 A1 | 8/2006 | Heard et al. |
| 2006/0259517 A1 | 11/2006 | Urscheler et al. |
| 2007/0044146 A1 | 2/2007 | Murase et al. |
| 2007/0220099 A1 | 9/2007 | Di Giorgio et al. |
| 2007/0299918 A1 | 12/2007 | Roberts |
| 2009/0323678 A1 | 12/2009 | Wang |
| 2011/0202988 A1 | 8/2011 | Otranen et al. |
| 2011/0320614 A1 | 12/2011 | Makavy et al. |
| 2013/0165084 A1 | 6/2013 | Xu et al. |
| 2013/0252585 A1 | 9/2013 | Moshir et al. |
| 2014/0165200 A1 | 6/2014 | Singla |

OTHER PUBLICATIONS

USPTO, Non-Final Rejection for U.S. Appl. No. 11/112,690, Dec. 23, 2008.

USPTO, Final Rejection for U.S. Appl. No. 11/112,690, Jun. 8, 2009.

USPTO, Non-Final Rejection for U.S. Appl. No. 11/112,690, Oct. 6, 2009.

USPTO, Notice of Allowance for U.S. Appl. No. 11/112,690, Jun. 10, 2010.

USPTO, Non-Final Rejection for U.S. Appl. No. 11/525,294, Jan. 27, 2009.

USPTO, Non-Final Rejection for U.S. Appl. No. 11/525,294, Jun. 26, 2009.

USPTO, Final Rejection for U.S. Appl. No. 11/525,294, Nov. 24, 2009.

USPTO, Non-Final Rejection for U.S. Appl. No. 11/525,294, Jan. 28, 2010.

USPTO, Final Rejection for U.S. Appl. No. 11/525,294, Jul. 6, 2010.

USPTO, Notice of Allowance for U.S. Appl. No. 11/525,294, Dec. 13, 2010.

USPTO, Non-Final Rejection for U.S. Appl. No. 11/640,629, Feb. 1, 2010.

USPTO, Final Rejection for U.S. Appl. No. 11/640,629, Jul. 9, 2010.

USPTO, Non-Final Rejection for U.S. Appl. No. 11/640,629, Aug. 24, 2012.

USPTO, Notice of Allowance for U.S. Appl. No. 11/640,629, Oct. 17, 2012.

USPTO, Non-Final Rejection for U.S. Appl. No. 13/614,583, Jun. 3, 2013.

USPTO, Notice of Allowance for U.S. Appl. No. 13/614,583, Mar. 17, 2014.

USPTO, Non-Final Rejection for U.S. Appl. No. 14/487,093, Aug. 26, 2015.

USPTO, Notice of Allowance for U.S. Appl. No. 14/487,093, Apr. 13, 2016.

USPTO, Non-Final Rejection for U.S. Appl. No. 15/045,357, May 13, 2016.

* cited by examiner

MULTIPLE DATA STORE AUTHENTICATION

CROSS-REFERENCE TO RELATED APPLICATIONS

This application is a continuation of U.S. patent application Ser. No. 14/487,093 entitled "FLEXIBLE REAL-TIME INBOX ACCESS" filed Sep. 16, 2014, which is a continuation of U.S. patent application Ser. No. 13/614,583 entitled "Flexible Real-Time Inbox Access" which is a continuation of U.S. patent application Ser. No. 11/640,629 filed Dec. 18, 2006 and entitled "Flexible Real-Time Inbox Access" which is a continuation-in-part and claims the priority benefit of U.S. patent application Ser. No. 11/525,294 filed Sep. 21, 2006, now U.S. Pat. No. 8,064,583 and entitled "Multiple Data Store Authentication" which is a continuation and claims the priority benefit of U.S. patent application Ser. No. 11/112,690 filed Apr. 21, 2005, now U.S. Pat. No. 7,796,742 and entitled "Systems and Methods for Simplified Provisioning". The disclosures of these commonly owned and assigned applications are incorporated herein by reference.

BACKGROUND OF THE INVENTION

1. Field of the Invention

The present invention relates generally to service activation, and more particularly to systems and methods for simplified provisioning and multiple data store authentication.

2. Description of Related Art

Conventionally, a user purchasing services associated with a device needs to register with a service provider to provide specific information about the user. The service provider often has a customer service center that assists the user with registration for various services associated with the wireless device. For instance, the customer service center can record personal information about the user in order to provide wireless Internet services. The service provider typically requires billing information from the user in order to identify the user and collect monies from the user for the services being provided.

When the user activates various services, the service provider may program various databases with the user's personal information, as well as information associated with the device the user is using to access the services. This process may be referred to as "provisioning." Often, the user spends time on the phone with a representative of the service provider in order to provide the information the service provider requires in order to program the various databases. Alternatively, the user may spend time on a device associated with the user in order to provide the requisite information for the provisioning. In exchange for providing the information to the service provider, the user obtains access to certain resources made available by the service provider.

Collecting the user's personal information and storing the information in the databases is frequently done in order to maintain security and ensure that each user pays for the resources being requested. However, users often resent the time it takes to register for access to the resources. Further, users may register many times with the same service provider for different resources available via the service provider. Numerous minutes or hours spent entering information required by the service provider may deter users from subscribing to the various resources offered by the service provider. There is, therefore, a need for a system and method for simplified provisioning.

SUMMARY OF THE INVENTION

An exemplary embodiment of the present invention provides a system for authenticating access to multiple data stores. The exemplary embodiment may include a server, which is coupled to a network. A client device may communicate with the server via the network. Various client devices may be used in this embodiment including cellular telephones, personal digital assistants, or a personal computer. The server may be configured to authenticate access to a plurality of data stores coupled to the server. As a result of authentication, the server may access and forward information at the data stores to the client. In one example, the data stores may be associated with an electronic mail server provider.

Authentication to the plurality of data stores may occur by utilizing data provided to the server by the client device. Authentication may also occur by comparing the data provided to the server by the client device with information at the plurality of data stores, which may have been provided by the client device during a previous authentication encounter.

In some embodiments, the server may be further configured to authenticate the client device prior to the server authenticating access to the plurality of data stores. Authentication of the client device may, for example, include the user of information identifying the client device or a token, which comprises a unique string of data. Alternatively, the server may be further configured to authenticate a user of the client prior to the server authenticating access to the plurality of data stores. Authentication may include use of a user name or a user name in further combination with a password.

In another exemplary embodiment of the present invention, a computing device for authenticating access to multiple data stores is provided. The computing device may include a communications interface for exchanging information over a network; an identification module for identifying a client device or user thereof based on information provided by the client device; and a registration module for accessing multiple data stores and authenticating access to the multiple data stores by the client device or user thereof. The communications interface may also receive information from the multiple data stores following authentication and may further forward received information to the client device.

The identification module of the computing device may identify the client device based on a client identifier. The client identifier may include a unique string of data (a token), which may have been previously assigned to the client device by the identification module. The client identifier, in another embodiment, may include a telephone number or, alternatively, a user name associated with a user of the device.

The identification module, in some embodiments of the present invention, may compare the aforementioned client identifier with information at one or more of the multiple data stores. The information at the multiple data stores may include information provided by the client device during a previous authentication operation. The registration module may also query the user of the client device for information required for accessing the multiple data stores if that information is not currently present.

An exemplary embodiment of the present invention provides a method for authenticating access to multiple data stores. In the exemplary method, a request is received from a client device to access a data store. Information associated with accessing the data store is stored and an identifier is assigned to the client device, that identifier being associated with the stored information. When a subsequent request for access to the data store is received, a query is made with respect to the identifier and if the identifier corresponds to the stored information for accessing the aforementioned data store, the data store is accessed.

In another embodiment of the aforementioned method, a client device may request access to a second data store. Information associated with accessing the second data store may be stored and further associated with the identifier initially associated with information concerning the access of the first data store. Upon receipt of a subsequent request for access to the second data store, if the assigned identifier corresponds to the information associated with accessing the second data store, access is granted to that data store. The information accessed at the first and second data store may be forwarded to the client device. That information may be electronic mail.

In yet another exemplary method for authenticating access to multiple data stores, a client device request for access to a data store is received. The client device may then be queried for an identifier associated with stored information for accessing the data store. If the assigned identifier corresponds to the information associated with accessing the data store, then the store may be accessed. The method may further include the steps of accessing a further data store if the assigned identifier corresponds to information associated with accessing the further data store. The information at the data stores may then be forwarded to the client device. The information may be electronic-mail.

An embodiment of the present invention provides for a computer-readable medium having embodied thereon a program executable by a processor to perform a method for authenticating access to multiple data stores. The method may include receiving a client device request for access to a data store; storing information associated with accessing the data store; assigning an identifier to the client device, wherein the identifier is associated with the stored information for accessing the data store; receiving a subsequent request for access to the data store; querying the client device for the assigned identifier; and accessing the data store if the assigned identifier corresponds to the information associated with accessing the data store.

The computer-readable medium may further include a program executable to receive a client device request for access to a second data store; store information associated with accessing the second data store; associate the stored information for accessing the second data store with the previously assigned identifier; receive a subsequent request for access to the second data store; and access the second data store if the assigned identifier corresponds to the information associated with accessing the second data store.

In yet another embodiment of the present invention, a computer-readable medium is provided for authenticating access to multiple data stores. The method may include receiving a client device request for access to a data store; querying the client device for an identifier associated with stored information for accessing the data store; accessing the data store if the assigned identifier corresponds to the information associated with accessing the data store; and accessing a second data store if the assigned identifier corresponds to information associated with accessing the second data store. The computer-readable medium may further include program instructions for forwarding information at the data stores to the client device, wherein the forwarded information is electronic mail.

DETAILED DESCRIPTION

Figure 1:
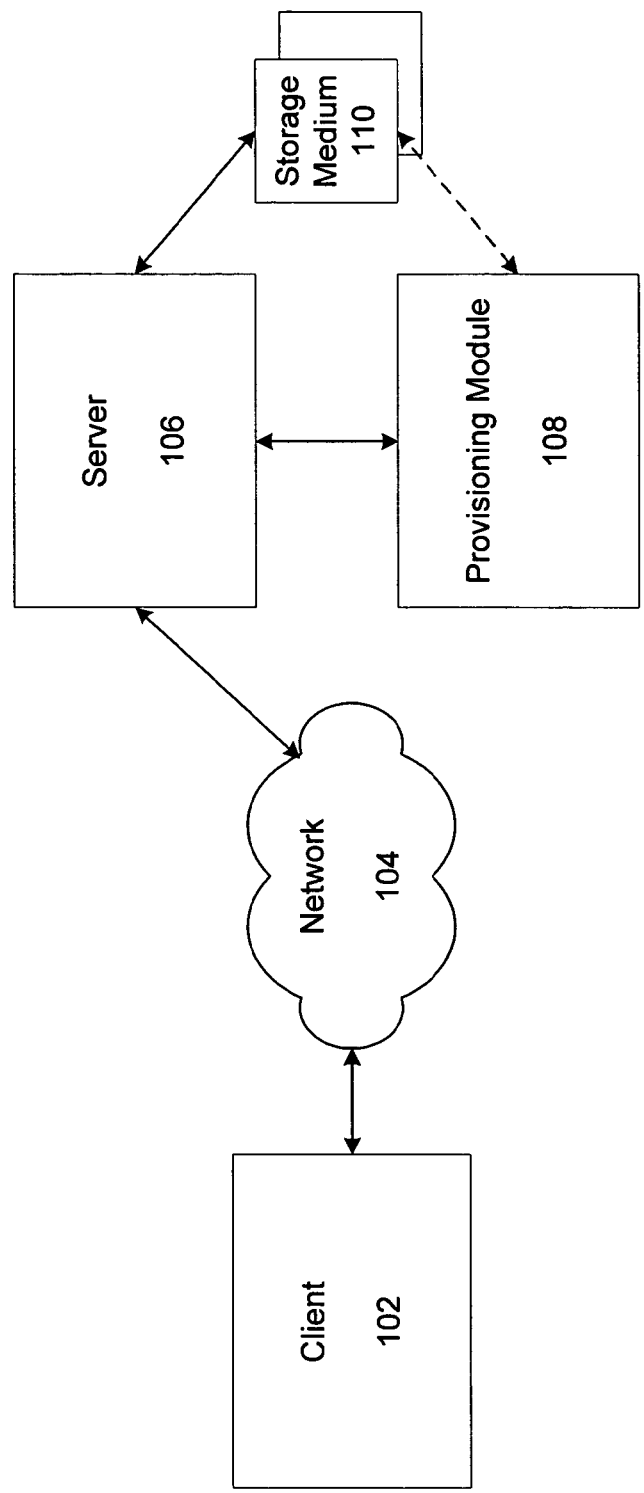
FIG. 1 shows an exemplary environment for providing simplified provisioning in accordance with one embodiment.

Referring to FIG. 1, an exemplary environment for providing simplified provisioning in accordance with one embodiment is shown. A client 102 communicates with a server 106 via a network 104. The client 102 may include any type of device, such as a cellular telephone, a personal digital assistant (PDA), a personal computer, etc.

Any type of provisioning may be provided according to various embodiments. For instance, the provisioning may include an event registering a user in response to a user request for services, a communication to the user offering services, a communication to the user including activation data, a communication to the user with a uniform resource locator (URL) where the user can obtain additional information regarding services, and so on ("provisioning event"). Any type of provisioning event is within the scope of one embodiment.

Similarly, any type of services provided by a service provider managing the provisioning events is possible. For instance, the service provider may provide internet services, application services, wireless services, and so on.

A provisioning module 108 may be coupled to the server 106 for providing provisioning event related services. In one embodiment, the provisioning module 108 is included as a component of the server 106. In another embodiment, the provisioning module 108 provides provisioning event related processing for various servers.

The server 106 may include or otherwise have access to one or more storage mediums 110. Any type of storage medium 110 may be employed according to various embodiments. In FIG. 1, the server 106 is coupled to the storage medium(s) 110 for storing and accessing information included in the storage medium(s) 110.

In an exemplary embodiment, the client 102 contacts the server 106 via the network 104 in order to request and/or access services provided by a service provider associated with the server 106. For example, a user at the client 102 may wish to subscribe to email services available by the service provider. The server 106 requests information about the user at the client 102 or about the client 102 itself before allowing the user to access services. In order to verify that the client 102 is genuine, the server 106 may access the storage medium(s) 110 to match data provided by the client 102 with information the server 106 stored in the storage medium(s) 110 as a result of prior encounters with the client 102.

Any manner of collecting information associated with the user and/or the device 102 associated with the user may be employed. The server 106 may collect the information from previous encounters with the device 102, from other service providers associated with the user and/or the device 102, and/or from any sources providing information about the user and/or the device 102.

The server 106 utilizes the provisioning module 108 to provide specified services and configurations for those services to the user at the client 102. The provisioning module 108 may verify information associated with the client 102 in one embodiment. The provisioning module 108 may have access to the storage medium(s) 110 via the server 106 or via a direct connection to the storage medium(s) 110.

Figure 2:
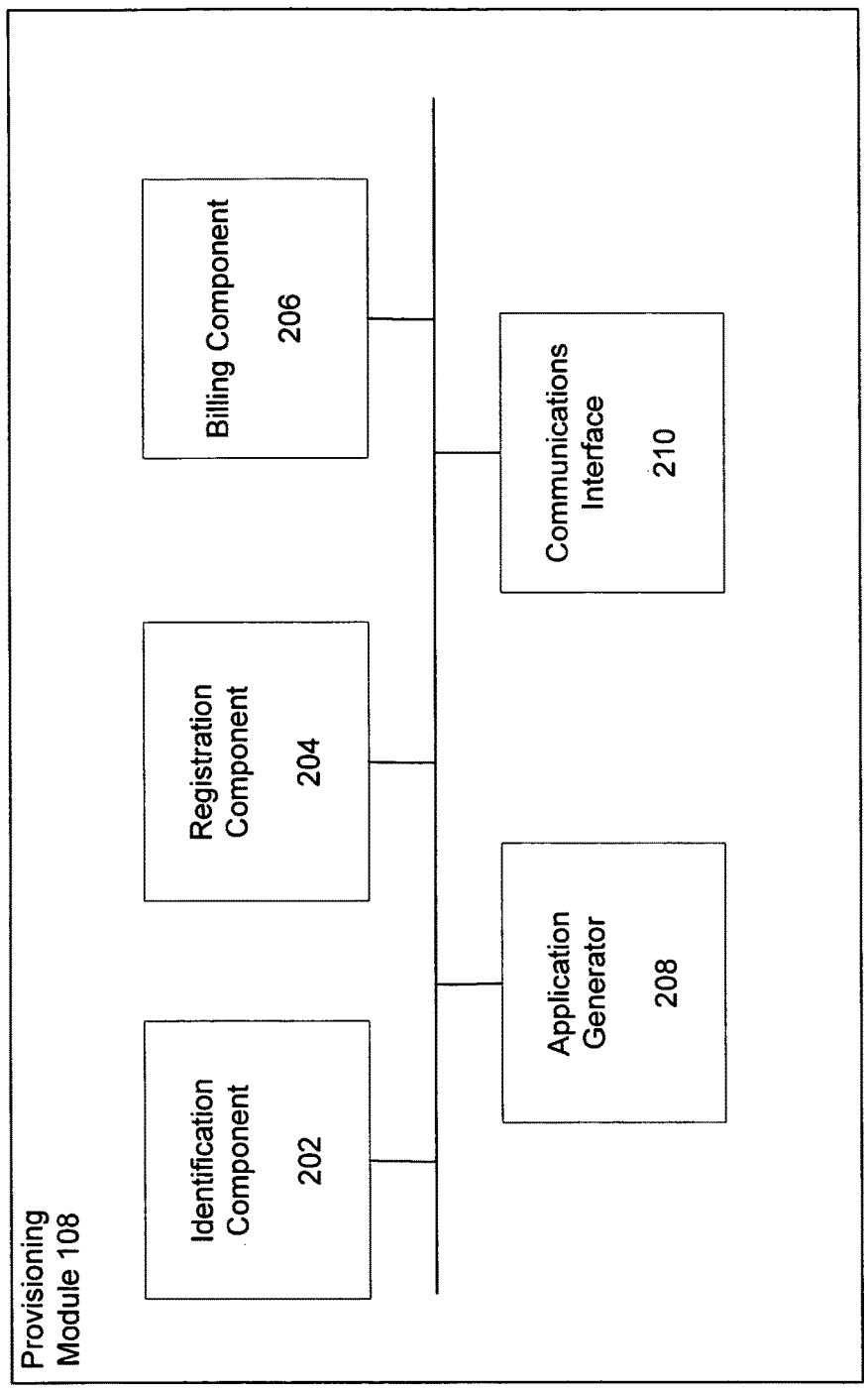
FIG. 2 shows a schematic diagram of an exemplary provisioning module in accordance with one embodiment.

Turning now to FIG. 2, a schematic diagram of an exemplary provisioning module 108 in accordance with one embodiment is shown. The provisioning module 108 may provide users with accounts, the appropriate access to those accounts, all the rights associated with those accounts, all of the resources necessary to manage the accounts, and so forth. Provisioning may be utilized to refer to service activation and may also involve programming various databases, such as the storage medium(s) 110, with the user's information, as discussed herein. Although the server 106 may be identified as performing various functions, any of the functions may be performed by the provisioning module 108 and/or components thereof.

The provisioning module 108 may include an identification component 202. The identification component 202 may perform various tasks related to identifying the client 102 and/or the user associated with the client 102. The identification component 202 may assign an identifier to the client 102 and/or information associated with the user at the client 102 when the client 102 is connected to the server 106. The identification component 202 may store the information in the storage medium(s) 110 according to the identifier the identification component 202 associates with the information.

In one embodiment, the identification component 202 assigns a unique identifier, such as a number string, to the client 102 and stores the information associated with the client 102 according to the unique identifier. The identification component 202 may then forward the unique identifier to the client 102 as a communication, or part of a communication, so that the client 102 can provide the unique identifier when the client 102 connects to the server 106 on another occasion.

In another embodiment, a phone number associated with the client 102 is utilized by the identification component 202 to store information associated with the client 102. Accordingly, when the client 102 makes further contact with the server 106, the phone number may be used to access the information stored according to the phone number. The user may provide the phone number associated with the client 102 and/or the client 102 may provide the phone number to the server 106 when initial access to the server 106 is gained by the client 102.

The identification component 202 may also compare information provided by the user of the client 102 with information stored in the storage medium(s) 110 related to the client 102. The comparison may be performed in order to verify that the user of the client 102 is the same user of the client 102 about which the server 106 captured information during a previous encounter. The comparison may also be performed to ensure that the client 102 information in the storage medium(s) 110 is accurate.

For instance, if the phone number is utilized as the identifier and the phone number provided by the user at the client 102 in response to a query is different from the phone number in the storage medium(s) 110, the user may have entered the phone number incorrectly, the original information gathered at the server 106 may have been entered incorrectly, and so on. The information from the storage medium(s) 110 and the client 102 may be compared for any reason. As discussed herein, the server 106 may collect the information associated with the user and/or the client 102 during previous encounters with the client 102 and/or from any other sources.

A registration component 204 may also be included with the provisioning module 108. The registration component 204 can utilize information from the storage medium(s) 110 to "pre-fill" or to otherwise fill in information associated with, a registration for the user associated with the client 102. The server 106 captures information about the user when the client 102 accesses the server 106 initially and/or from any other source, as discussed herein.

For example, when the client 102 logs onto the server 106 to check email, the server 106 may capture the phone number of the client 102, the username of the user associated with the client 102, or any other information associated with the client 102. The information is stored in the storage medium(s) 110 according to a unique identifier assigned by the identification component 202, according to the phone number associated with the client 102, or according to any other method. When the client 102 logs onto the server 106 again in order to request instant messaging services, for example, the registration component 204 accesses the information in the storage medium(s) 110 in order to complete a registration for the user at the client 102 requesting the services.

The registration component 204 can then query the user for any information needed for registration that is not included in the information in the storage medium(s) 110. In one embodiment, information associated with the user and the client 102 is collected by the server 106 from other sources, rather than from a previous encounter the client 102 had with the server 106, as discussed herein. For instance, another service provider may forward information associated with the client 102, the server 106 may access information about the client 102 on available databases utilizing the phone number or other information about the client 102, and so forth. Any manner of gathering information about the client 102 to pre-fill the registration for services is within the scope of an embodiment.

The registration component 204 can register the user at the client 102 for any services offered by the service provider associated with the server 106, or otherwise. In one embodiment, the registration component 204 can pre-fill information related to services being requested by the user other than identification information. For instance, the server 106 may store information related to user preferences in the storage medium(s) 110. When the user requests services, the registration component 204 may utilize the user preferences information to pre-fill feature selections associated with the requested services. For example, the registration component 204 may pre-select calendar features for the user according to user preferences captured by the server 106 about user activity related to other services, whether those services are offered by the service provider or not.

A billing component 206 may be included with the provisioning module 108. The billing component 206 can track user activity of the services provided by the service provider. Accordingly, the billing component 206 can determine when to bill the user for the services being provided. The registration component 204 can provide user information to the billing component 206 that may be needed regarding where to bill the user, such as an email address, for instance.

An application generator 208 may be included with the provisioning module 108 for configuring the application and/or services requested by the user for the device 102 associated with the user. The application generator 208 can also create the application for the user including any features the user desires. Any type of application generator, 208 may be provided.

In one embodiment, the application generator 208 may utilize provisioning templates to create the profiles for configuring various devices, such as the client 102 (FIG. 1) associated with the user. For instance, the templates may provide the parameters for creating a particular application. The user can also specify customizations to the application, which can be used to modify the template for the application by the application generator 208. In other words, the provisioning templates can provide parameters for configuring various devices for the services as well as customizing the actual service features.

A communications interface 210 may also be provided with the provisioning module 108. The communications interface 210 receives communications from the user and/or the server 106 and processes the input utilizing the components discussed herein.

Although the provisioning module 108 is described as including various components, the provisioning module 108 may include more components or fewer components than those listed and still fall within the scope of an embodiment of the invention. For example, the provisioning module 108 may also include business rules for building the applications, a customer service component for managing applications and errors, a protocol configuration component for managing a variety of protocols associated with various devices, and so forth.

Figure 3:
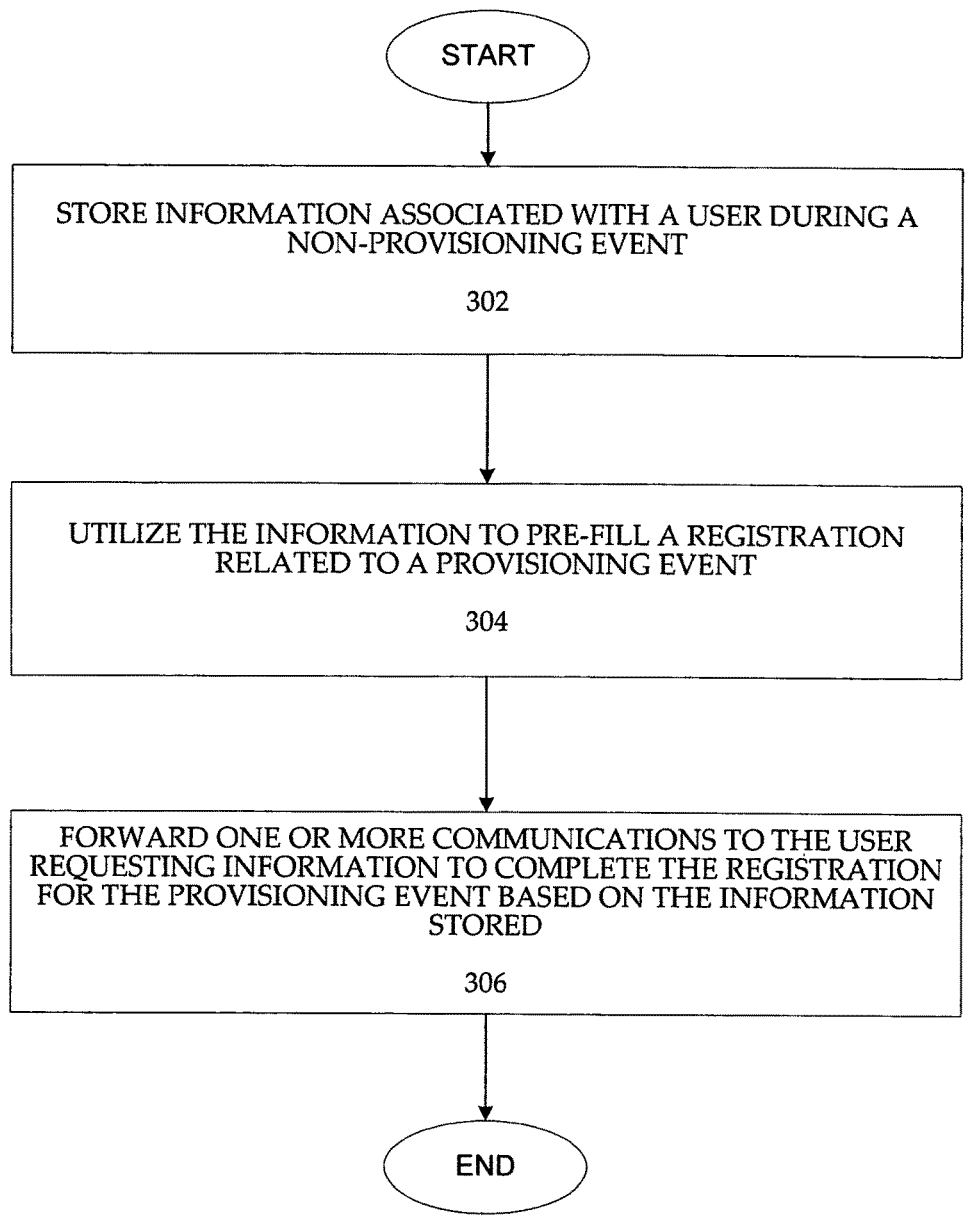
FIG. 3 shows a flow diagram of an exemplary process for providing simplified provisioning in accordance with one embodiment.

FIG. 3 shows a flow diagram of an exemplary process for providing simplified provisioning in accordance with one embodiment. At step 302, information associated with a user during a non-provisioning event is stored. As discussed herein, the information may be stored in the storage medium(s) 110. The server 106 collects information about the user and the client 102 associated with the user when contact is made with the server 106 at a time when provisioning is not occurring. In one embodiment, as discussed herein, the server may collect information related to the user and the client 102 from another source, rather than from the client 102, which also may constitute a non-provisioning event.

In one embodiment, the information related to the user and the client 102 may be collected during one or more previous provisioning events. For instance, the server 106 may store information associated with the user and the client 102 during previous provisioning events in order to avoid or limit querying the user for the same information during future provisioning events.

The information may be stored according to a phone number associated with the device 102 and/or according to a unique identifier assigned to the device 102. For example, the server 106 may assign a unique identifier to the information collected from the device 102 when the device 102 is connected to the server 106. In order to associate the unique identifier to the device 102 for recognition during future contact with the server 106, a text message, for example, can be sent to the device 102 with the unique identifier. The unique identifier may then be sent back to the server 106 to identify the device 102 if the phone number, for example, cannot be accessed by the server 106. As discussed herein, in one embodiment, the server 106 receives information about the user and/or the client 102 from a third party source and stores the information according to the phone number and/or a unique identifier.

At step 304, the information is utilized to pre-fill a registration related to a provisioning event. The information collected by the server 106 from the client 102 during a previous contact with the server 106 and/or from another source (e.g., phone network) is utilized to complete as much of a registration as possible without user input. Accordingly, the user at the client 102 is not required to provide information that the server 106 can access itself.

At step 306, one or more communications are forwarded to the user. The one or more communications are based on the information stored and request information to complete the registration for the provisioning event. In one embodiment, the information requested to complete the registration includes a user query to verify that the information used to complete the registration is correct. The information requested may include a user query to provide a password to complete the registration process, in another embodiment.

By using the information collected by the server 106 during a non-provisioning event that occurred prior to a current provisioning event to complete a registration, or a portion of the registration, the user at the client 102 can provide less information than required if no information about the user was accessible or utilized to pre-fill the registration. Accordingly, the user at the client 102 is provided with simplified provisioning.

Figure 4:
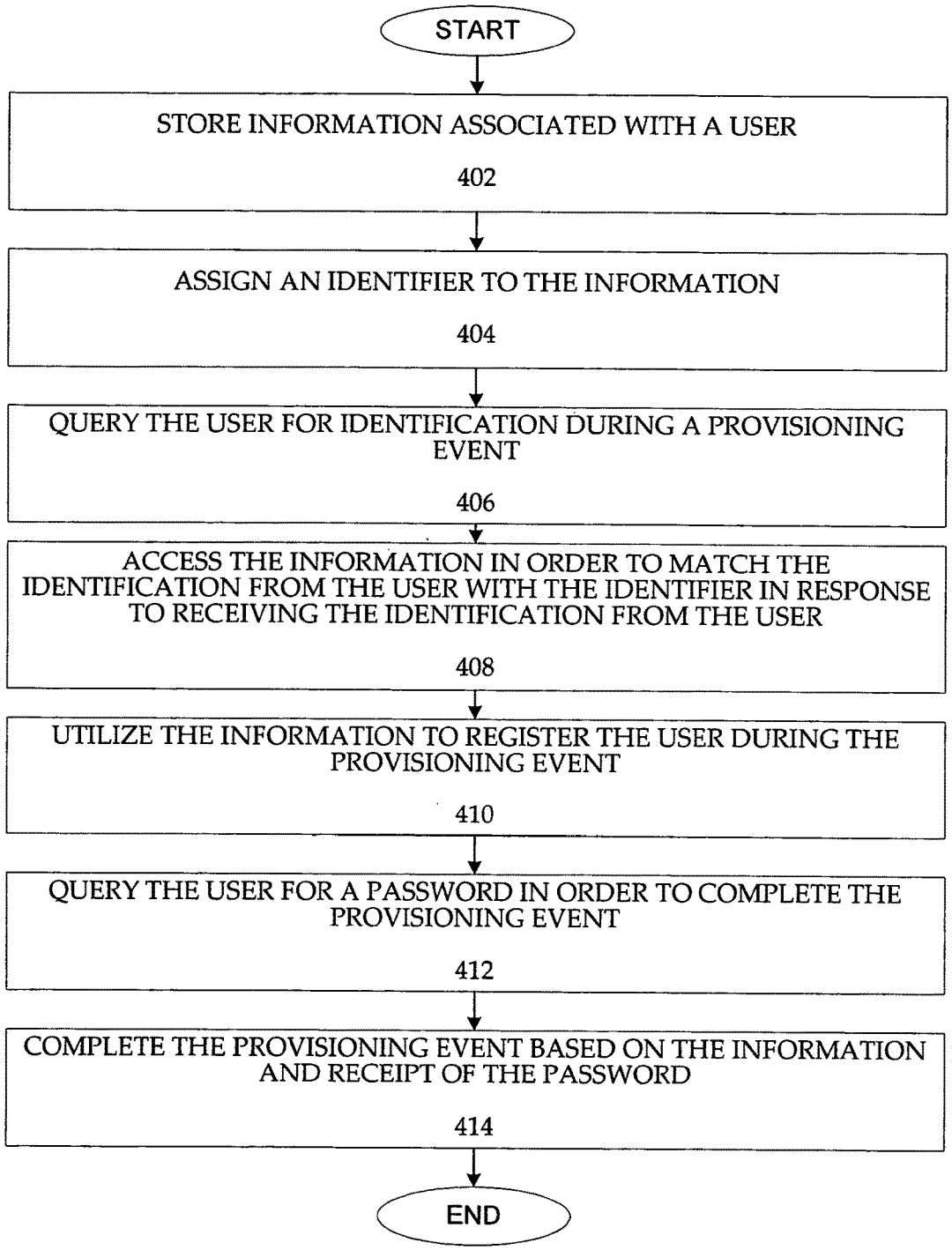
FIG. 4 shows a detailed process for providing simplified provisioning in accordance with one embodiment.

Turning now to FIG. 4, a detailed process for providing simplified provisioning in accordance with one embodiment is shown. At step 402, information associated with a user is stored. As discussed herein, the information may be stored by the server 106 to one or more storage mediums, such as the storage medium(s) 110 discussed in FIG. 1.

An identifier is assigned to the information at step 404. The identifier may be assigned to the information in order to locate the information in the storage medium(s) 110, in order to compare the information with other information provided by the user during future contacts with the server 106, and so on. The identifier may be assigned to the information for any reason. As discussed herein, the identifier may be a phone number associated with a device of the user, such as the device 102 discussed in FIG. 1, a unique identifier assigned by the identification component 202 of the provisioning module 108 associated with the server 106, and/or any other type of identifier.

At step 406, the user is queried for identification during a provisioning event. The identification sought from the user may be confirmation of the identifier used to store the information at step 404, such as the phone number and/or the unique identifier. The identification sought, however, may be any type of information from the user. For example, a "username" may be sought in order to match the username associated with the user with the username stored in the storage medium(s) 110.

At step 408, the information is accessed in order to match the identification from the user with the identifier associated with the information in response to receiving the identification from the user. The provisioning module 108 accesses the information in the storage medium(s) 110, directly or via the server 106, associated with the user and compares that information with the identification received from the user in response to the query.

By locating the information in the storage medium(s) 110 that was previously collected, the information can be utilized to register the user during the provisioning event at step

410. The information can complete the registration or a portion of the registration associated with the services for which the provisioning event is taking place. By completing the registration or a portion of the registration with information existing about the user and the user device, such as the device 102 discussed in FIG. 1, the user is only required to provide data for the registration not included in the information from the storage medium(s) 110. Thus, the user experiences a streamlined provisioning process.

In one embodiment, as discussed herein, the information is utilized to complete the registration and the user is queried to verify that the information utilized is correct. In another embodiment, the user is queried to verify the accuracy of the information utilized according to a length of time between the provisioning event and when the information was collected. For instance, if the information was collected by the server 106 less than one month prior to the provisioning event, the server 106 may not seek verification from the user that the information is still accurate.

At step 412, the user is queried for a password in order to complete the provisioning event. The password may help to ensure that an intended user receives services. For instance, the server 106 may forward the communication regarding services to a user that did not request the services or requested the services using another user's information. Provisioning related information may erroneously reach users for a variety of reasons. The user is queried for the password in order to verify that the user matches the intended user. For instance, if the provisioning information is sent to a "user b" rather than the intended "user a," "user b" will likely not know the "user a" password and resultantly will not be able to receive the services intended to go to the "user a."

The provisioning event is completed in response to receiving the password at step 414. The password is compared with a password in the storage medium(s) 110. Provided the password matches the password known for the particular user, the provisioning event may be completed. In one embodiment, the server 106 accesses another database with user password information in order to confirm that the password provided is correct. Any method of verifying the password may be employed.

As discussed herein, the information from the storage medium(s) 110 may be sufficient for completing the registration for the service provider. However, the service provider may require additional information to complete the registration. For instance, the information about the user and/or the client 102 associated with the user the server 106 originally captured may not provide enough information about the user and/or the client 102 required for the registration for the services associated with the provisioning event. Accordingly, more information may be collected from the user. As part of the simplified provisioning process described in FIG. 4, or any other exemplary provisioning process, the user may be queried for additional information to complete the registration.

In one embodiment, the server 106 stores information associated with the user during the client 102 connection with the server sometime prior to the provisioning event. Using the provisioning templates, discussed in FIG. 2 in connection with the application generator 208, the server 106 may collect other information about the user from third party databases in order to complete registration for provisioning for many of the service provider's services based on the provisioning templates. Any type of method for gathering information about the user and/or the device 102 associated with the user for simplifying provisioning is within the scope of various embodiments.

While various embodiments have been described above, it should be understood that they have been presented by way of example only, and not limitation. For example, any of the elements associated with the provisioning module may employ any of the desired functionality set forth hereinabove. Thus, the breadth and scope of a preferred embodiment should not be limited by any of the above-described exemplary embodiments. These embodiments include computer programs embodied on computer readable mediums for executing the methods disclosed herein.

We claim:

1. A server communicatively coupled to a network and one or more data stores, the server comprising:
   a processor; and
   a memory, wherein the server is configured to:
      receive, from a client device, a unique identifier for the client device, wherein the unique identifier is transmitted between the client device and the server as part of an initial communication, wherein the unique identifier is also used in a subsequent communication;
      store the unique identifier for the client device;
      identify the client device using the stored unique identifier;
      receive registration information from the client device;
      store the registration information;
      associate the stored registration information with the unique identifier of the client device;
      receive, via a communication with the client device, a request for the client device to receive information from the one or more data stores, wherein the request includes the unique identifier;
      configure a service to access the one or more data stores on behalf of the client device using the stored registration information; and
      forward the requested information from the one or more data stores to the client device based on the unique identifier that is included within the request.

2. The server of claim 1, wherein the one or more data stores are associated with an electronic mail service provider.

3. The server of claim 1, wherein the client device is one of a cellular telephone, personal digital assistant, or personal computer.

4. The server of claim 1, wherein the server authenticates the client device prior to the server authenticating access to the one or more data stores.

5. The server of claim 1, wherein the server authenticates a user of the client device prior to the server authenticating access to the one or more data stores.

6. The server of claim 4, wherein the authentication of the client device includes the use of the unique identifier.

7. The server of claim 4, wherein the unique identifier is a token, the token comprising a unique string of data.

8. The server of claim 5, wherein the authentication of the user of the client device includes the use of a user name.

9. The server of claim 8, wherein the authentication of the user of the client device includes the use of the user name in combination with a password and wherein authenticating access to the one or more data stores also includes the use of the user name in combination with the password.

10. The server of claim 1, wherein, upon receiving the information from the data store, the server is further configured to:

use one of the stored registration information or an internal identifier associated with the stored registration information to determine the unique identifier that should receive the information from the data store; and wherein forwarding the information from the one or more data stores to the client device includes providing any data queued for the determined identifier when the client device connects and presents the unique identifier.

11. The server of claim 1, wherein, upon receiving the information from the data store, the server is further configured to:

store the information from the data store for accounts identified by the stored registration information or an internal identifier associated with the stored registration information; and retrieve the information from the data store for the accounts identified by the stored registration information or the internal identifier when the client device connects and presents the unique identifier.

12. A computing device for authenticating access to one or more data stores, comprising:

a communications interface that exchanges registration information and identification information over a network;

a memory and a processor, wherein the computing device is configured to:

receive, from a client device, a unique identifier for the client device, wherein the unique identifier is transmitted between the client device and the computing device as part of an initial communication, wherein the unique identifier is also used in a subsequent communication;

store the unique identifier for the client device;

identify the client device using the stored unique identifier;

receive registration information from the client device;

store the registration information; and associate the stored registration information with the unique identifier of the client device; and wherein the computing device is further configured to:

receive, via a communication with the client device, a request for the client device to receive information from the one or more data stores, wherein the request includes the unique identifier;

configure a service to access the one or more data stores on behalf of the client device using the stored registration information and/or the additional registration information, wherein the client device need not make contact with the one or more data stores for the purpose of authentication; and forward the requested information from the one or more data stores to the client device based on the unique identifier that is included within the request.

13. The computing device of claim 12, wherein the client device can provide the unique identifier for verification purposes when the client device subsequently communicates with the computing device.

14. The computing device of claim 12, wherein the communications interface receives information from the one or more data stores following authentication of the client device or user thereof.

15. The computing device of claim 14, wherein the communication interface forwards the information received from the one or more data stores to the client device.

16. The computing device of claim 12, wherein the unique identifier is a token comprising a unique string of data.

17. The computing device of claim 12, wherein the unique identifier is a telephone number.

18. The computing device of claim 12, wherein, upon receiving the information from the data store, the computing device is further configured to:

use one of the stored registration information or an internal identifier associated with the stored registration information to determine the unique identifier that should receive the information from the data store, and wherein forwarding the information from the one or more data stores to the client device includes providing any data queued for the determined identifier when the client device connects and presents the unique identifier.

19. The computing device of claim 12, wherein, upon receiving the information from the data store, the computing device is further configured to:

store the information from the data store for accounts identified by the stored registration information or an internal identifier associated with the stored registration information; and retrieve the information from the data store for the accounts identified by the stored registration information or the internal identifier when the client device connects and presents the unique identifier.

20. A method for authenticating access to one or more data stores, comprising:

receiving, at a server from a client device, a unique identifier for the client device, wherein the unique identifier is transmitted between the client device and the server as part of an initial communication, wherein the unique identifier is used in a subsequent communication;

storing the unique identifier for the client device;

identifying the client device using the stored unique identifier;

receiving, at the server, registration information from the client device;

storing the registration information;

associating the stored registration information with the unique identifier of the client device;

receiving a request from the client device for the client device to receive information from the one or more data stores;

using the stored registration information to configure a service to access the one or more data stores on behalf of the client device; and forwarding the requested access for information from the one or more data stores to the client device based on the unique identifier that is included within the request.

21. The method of claim 20, wherein the client device can present the unique identifier in a subsequent communication with the server.

22. The method of claim 20, further comprising querying the user to verify that the collected registration information associated with the unique identifier is correct.

23. The method of claim 22, wherein the user is queried to verify the accuracy of the collected registration information according to a length of time between registering the user for the requested service and when the collected information was collected.

24. The method of claim 22, further comprising querying the user for a password to complete the registration for the requested service.

25. The method of claim 20, further comprising, upon receiving the information from the data store:

using one of the stored registration information or an internal identifier associated with the stored registration information to determine the unique identifier that should receive the information from the data store; and wherein forwarding the information from the one or more data stores to the client device includes providing any data queued for the determined identifier when the client device connects and presents the unique identifier.

26. The method of claim 20, further comprising, upon receiving the information from the data store:

storing the information from the data store for accounts identified by the stored registration information or an internal identifier associated with the stored registration information; and retrieving the information from the data store for the accounts identified by the stored registration information or the internal identifier when the client device connects and presents the unique identifier.

* * * * *